(12) United States Patent
Thorne

(10) Patent No.: US 8,733,012 B2
(45) Date of Patent: May 27, 2014

(54) LURE FISHING ASSEMBLY WITH WEIGHTED WIREFORM

(71) Applicant: David Lynn Thorne, Kaysville, UT (US)

(72) Inventor: David Lynn Thorne, Kaysville, UT (US)

( * ) Notice: Subject to any disclaimer, the term of this patent is extended or adjusted under 35 U.S.C. 154(b) by 0 days.

(21) Appl. No.: 13/694,028

(22) Filed: Oct. 22, 2012

(65) Prior Publication Data

US 2013/0160347 A1    Jun. 27, 2013

Related U.S. Application Data

(63) Continuation-in-part of application No. 13/200,900, filed on Oct. 4, 2011, which is a continuation-in-part of application No. 12/387,024, filed on Apr. 27, 2009, which is a continuation-in-part of application No. 11/656,099, filed on Jan. 22, 2007, now abandoned.

(51) Int. Cl.
*A01K 85/00*    (2006.01)

(52) U.S. Cl.
USPC ........................................... 43/42.24

(58) Field of Classification Search
USPC ................. 43/42.29, 42, 42.5, 42.35, 42.11
See application file for complete search history.

(56) References Cited

U.S. PATENT DOCUMENTS

| | | | | |
|---|---|---|---|---|
| 2,522,179 A * | 9/1950 | Jensen, Sr. et al. | ........... | 43/42.22 |
| 2,569,792 A * | 10/1951 | Wilson | ............................ | 43/42.4 |
| 2,618,096 A * | 11/1952 | Wagner | ......................... | 43/42.47 |
| 2,979,848 A * | 4/1961 | McConnell | ....................... | 43/37 |
| 3,159,940 A * | 12/1964 | Bokun | .............................. | 43/35 |
| 3,284,945 A * | 11/1966 | Kurtis | ............................. | 43/44.2 |
| 3,405,475 A * | 10/1968 | Ross | ............................. | 43/42.08 |
| 3,462,871 A * | 8/1969 | McVay | ......................... | 43/42.47 |
| 4,016,671 A * | 4/1977 | Larsen | .......................... | 43/42.17 |
| 4,536,986 A * | 8/1985 | Stout | ........................... | 43/42.27 |
| 4,641,455 A * | 2/1987 | Johnson | ......................... | 43/42.13 |
| 4,790,101 A * | 12/1988 | Craddock | ..................... | 43/42.37 |
| 5,446,991 A * | 9/1995 | Brackus | ........................ | 43/42.37 |
| 5,857,283 A * | 1/1999 | Perrick | ........................... | 43/42.5 |
| 5,887,378 A * | 3/1999 | Rhoten | ........................ | 43/42.03 |
| 5,918,406 A * | 7/1999 | Wilson | ........................ | 43/42.28 |
| 7,197,846 B1 * | 4/2007 | Gibson | ........................ | 43/42.11 |
| 7,908,787 B2 * | 3/2011 | Finley | ............................. | 43/36 |
| 8,028,465 B1 * | 10/2011 | Wuensch et al. | ............. | 43/42.47 |
| 8,347,547 B1 * | 1/2013 | Houdek | ........................ | 43/42.13 |
| 2001/0045048 A1 * | 11/2001 | Johnson | ........................ | 43/42.39 |
| 2005/0086849 A1 * | 4/2005 | Perrick | ........................ | 43/42.47 |
| 2005/0210731 A1 * | 9/2005 | Davis | ................................. | 43/42 |
| 2012/0023805 A1 * | 2/2012 | Thorne | ........................ | 43/42.53 |

* cited by examiner

*Primary Examiner* — Valentina Xavier

(57) ABSTRACT

A fishing lure assembly is disclosed which comprises a blade free to oscillate, yaw and produce a trailing wake as the fishing lure assembly is displaced through water. A weight is affixed to the fishing lure assembly, but affixed to an associated wireform where it is inferiorly disposed relative to the blade such that the blade is free to oscillate and have side-to-side action, substantially unaffected by mass and inertia of the weight. The fishing lure may be variably constructed to include one or more hooks and artificial or natural soft bait and hard bait bodies which are disposed to follow behind the trailing wake of the blade. A compound lure is disclosed wherein the weight is replaced by a jig hook.

5 Claims, 4 Drawing Sheets

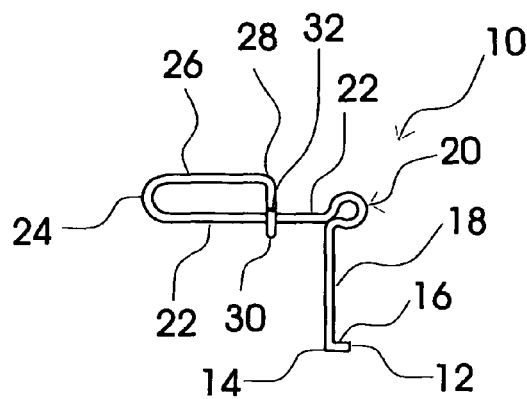
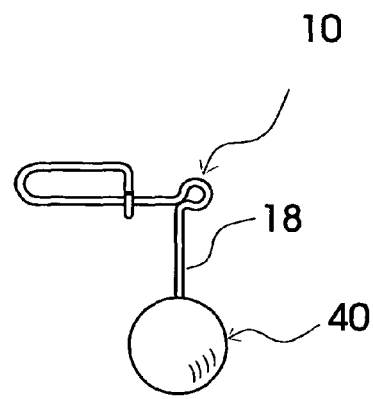
Figure 1
Figure 2
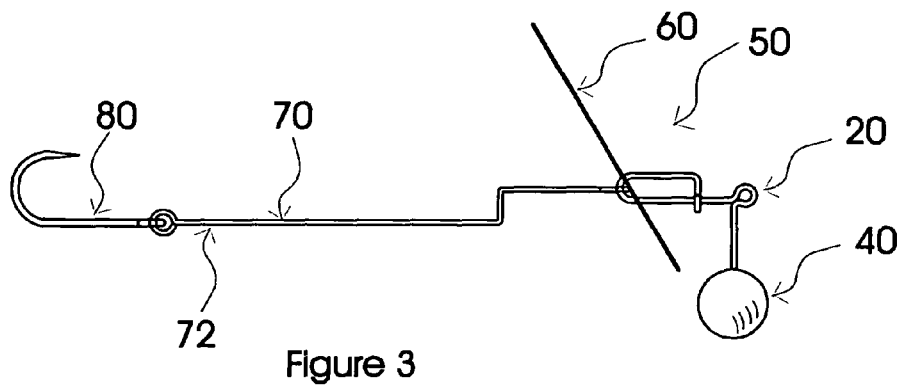
Figure 3
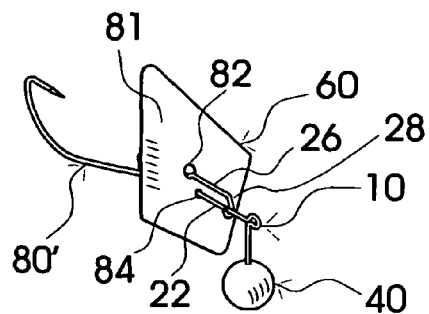
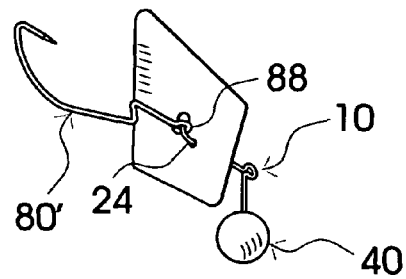
Figure 4
Figure 5

LURE FISHING ASSEMBLY WITH WEIGHTED WIREFORM

CONTINUITY

This application is a Continuation-in-Part of U.S. patent application Ser. No. 13/200,900, titled INTERCHANGEABLE BLADE AND LURE FISHING ASSEMBLY and filed Oct. 4, 2011 which is Continuation-in-Part of U.S. patent application Ser. No. 12/387,024, titled BLADED FISHING LURE and filed Apr. 27, 2009, which is a Continuation-in-Part of U.S. patent application Ser. No. 11/656,099, titled FISHING LURE ASSEMBLY and filed Jan. 22, 2007 by David L. Thorne, which are made part hereof by reference.

FIELD OF INVENTION

This invention relates to blades and frame assemblies from which fishing lures or other fishing gear may be constructed, and particularly wireframe assemblies which are affixed to an oscillating blade and fishhook and further affixed to a weight, the wireform comprising a loop for attaching a fishing line and a distending shaft for attaching the weight.

BACKGROUND AND RELATED ART

A snag resistant fishing lure is disclosed in U.S. Pat. No. 7,726,062 B2, issued Jun. 1, 2010 to James Ronald Davis (Davis). Davis discloses a jig with an attached blade. The jig has a weight molded about the shank of a hook with an eyelet disposed to maintain the sharpened point of a hook held upright by the relative dispositions of the eyelet, weight and orientation of the point. The blade is taught to be affixed to the eyelet and be limited in oscillation by either collision of the blade with the eyelet or with the weight to which it is directly affixed. Further, the blade is taught to comprise three holes, one of which is used to securely affix the blade to the eyelet. The other two holes are taught to be used in cooperation with a clip affixed to a fishing line for the purpose of releasably affixing the fishing line of a fishing lure unit which comprises both blade and weighted fishing lure.

In modern fishing art, two primary facets of a fishing lure include lure action and ease and efficiency of casting. Oft times these two facets are in opposition in bladed lures. Action of a bladed lure is often dependent upon blade resistance (especially for an oscillating blade) as a lure is displaced through water. Such resistance is counter to efficiency in casting, especially when long distance casts are desired.

Definitions:

For purposes of this disclosure, the following definitions apply:

aft, adv, near, toward, or in the rear of a lure blade, n, a broad flattened part which is affixed to a portion of a fishing lure and which oscillates as the lure is propelled in water to provide a wake following therefrom; such a blade may be rigid or flexible, if flexible such a blade requires a supporting mast to withstand pressure from being displaced through water centrally, adv, near, toward the center of gravity, syn: medically distal, adj, (see also proximal) indicates the segment of a device normally away from a line attachment of a lure fishhook, n, a device, usually made of rigid metal wire, comprising a curved section which has a sharpened point on one end for catching a fish and a shank which comprises a substantially straight portion on an opposite end. Generally, the shank is ultimately affixed with an eyelet or other attachment providing for connecting line and other accouterments the fishhook fishhook assembly, n, a combination of a fishhook and other optional attributes associated with the fishhook for attaching the fishhook to a frame or wireform and for adding attractive components such as an artificial or natural bait fore, adv, in, toward or adjacent to the front (i.e. forward)

inferior, adj, situated lower down or closer to the center of the earth than a referenced site jig, n, a fishhook which has a weight affixed about an associated shank of the fishhook proximal, adj, indicates the segment of a device normally closely disposed relative to a line attachment of a lure shank, n, a wire form which is a proximal portion of a fishhook the shank usually having a substantially straight portion which is associated with a curved portion of a fishhook and with a connecting link by which the fishhook is affixed to other fishing gear substantially, adv, in a manner relating to the most or main part or characteristic of something superior, adj, situated higher up or away from the center of the earth relative to a referenced site

BRIEF SUMMARY AND OBJECTS OF THE INVENTION

In brief summary, this novel invention provides a basis for a bladed fishing lure comprising a wireform affixed to a fishing line, a blade, a fishhook assembly and a weight affixed in a particular geometry to provide for high frequency side-to-side action of the fishhook assembly disposed in the wake of the blade as it oscillates when displaced through water. The wireform, blade and hook assembly are stabilized by the weight which is disposed to provide stabilization without substantially affecting frequency and magnitude of displacement of oscillation of the blade and associated fishhook assembly. Further, when in a casting mode, the weight becomes the driving inertia for blade, associated fishhook assembly and wireform and, as such, rotates the wireform and blade to a state of reduced resistance relative to that state which produces an oscillating blade when being displaced by a fishing line through water.

Primary to the invention is the wireform including a forwardly disposed eyelet or loop for attachment of a fishing line, an aft loop to which a fishhook assembly or lure part is pivotally affixed, the aft loop being formed by a plurality of bends in the wireform, the bends further forming a releasable clasp at the tag end. The clasp is sufficiently small to permit threading through holes in an associated blade and fishhood assembly eyelet. Once so threaded, the clasp is affixed to secure blade and fishhook assembly. Further, the wireform has a leg which distends away from the clasp a predetermined distance whereat a weight is affixed to stabilize the lure when drawn through water. Thus, the weight does not substantially affect oscillatory action of the blade as affixed by the clasp. The blade, not being required to bear mass of the weight may be made from either metal or plastic. So constructed, when the weight and lure are cast, the weight rotates the wireform such that the blade is disposed to "fly" with reduced resistance without a tendency to spin which would otherwise reduce momentum and casting distance.

Therefore, it is a primary object to provide a fishing lure comprising a wireform produced from a single wire having a series of bends forming an aft end loop and a tag end clasp which can be threaded through holes in a blade and eyelet of a fishhook assembly to pivotally secure both blade and assembly by the clasp, and, further forward, having an eye loop for fishing line attachment and an inferiorly distending shaft whereby the weight is affixed to the wireform.

It is an important object to provide a blade member having only two medially disposed holes by which the blade is securely, but pivotally affixed the wireform such that the blade is permitted to oscillate as the lure is displaced through water.

It is another important object to provide a fishhook assembly having a shaft and forwardly disposed eyelet whereby the fishhook assembly is pivotally affixed to the aft loop and disposed in the wake of the blade as the lure is displaced in water.

It is a primary object to provide a weight affixed to the inferior end of the distending shaft to provide an inertial mass which stabilizes the lure in water without substantially affecting blade oscillation It is an important object that the distending shaft be substantially displaced away from the the clasp so that, when an associated lure is cast, wireform and blade rotate to be disposed in a state of low resistance during flight.

It is another object to provide artificial bait affixed to the hook assembly such that as the fishhook assembly oscillates in the wake of the blade lifelike sinusoidal side-to-side action is effected upon the artificial bait.

It is another object to provide natural bait affixed to the hook assembly such that as the hook assembly oscillates in the wake of the blade lifelike sinusoidal side-to-side action is effected upon the natural bait.

BRIEF DESCRIPTION OF THE DRAWINGS

FIG. 1 is a side elevation of a magnified wireform made according to the invention.

FIG. 2 is a side elevation of the wireform seen in FIG. 1 with a weight affixed to a distending member of the wireform.

FIG. 3 is a side elevation of the wireform and weight seen in FIG. 2 with a fishhook assembly pivotally affixed to an aft loop of the wireform forming a clasp, the assembly comprising a fishhook and an elongated member by which the fishhook is displaced away from the clasp.

FIG. 4 is a forward perspective of the wireform and weight seen in FIG. 3 with a fishhook in place of the fishhook assembly and a blade affixed thereto.

FIG. 5 is an aft perspective of the wireform, weight, fishhook and blade seen in FIG. 4.

DETAILED DESCRIPTION OF THE ILLUSTRATED EMBODIMENTS

Figure 6:
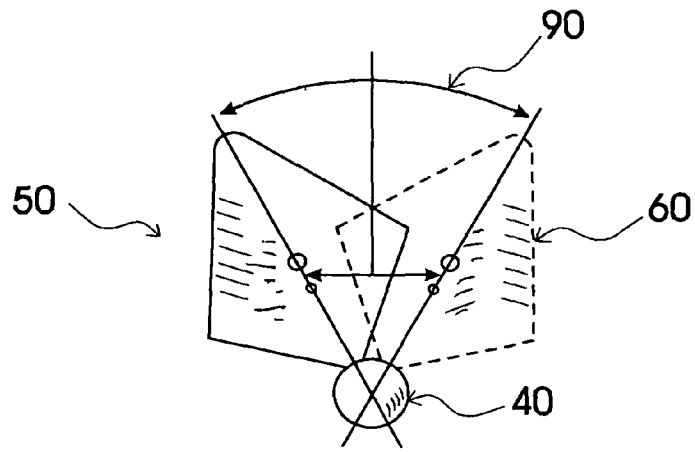
FIG. 6 is a frontal elevation of the blade and weight seen in FIG. 5 showing side-to-side rotating divergence of a portion of the lure due to blade oscillation, with one state of divergence indicated by dashed lines.

Reference is now made to the embodiments illustrated in FIGS. 1-17 wherein like numerals are used to designate like parts throughout. Primes of numbers, otherwise used without primes for designating labeled parts which are similar in form and/or function, but not identical, to those parts designated by the numbers without primes.

Reference is now made to FIG. 1 wherein a wireform 10 made according to the present invention is seen. Of course, a wireform may be embodied in other specific forms without departing from the spirit or essential characteristics thereof. As seen in FIG. 1, a first end 12 of wireform 10 is turned at an elbow 14 to provide an anchor 16 for a weight. As noted hereafter, anchor 16 may be in the form of an eyelet for attaching a weighted lure thereto. From elbow 14 an arm 18 extends upward to a circular ring 20 formed to permit a fishing line to be affixed thereat. Distending aftward from ring 20 a first leg 22 extends to a bend 24 which leads to a second leg 26 Second leg 26 extends forward a predetermined distance to a second elbow 28 where a clasp 30 is formed at the other (tag) end 32. As such, wireform 10 may be opened at clasp 30 to thread an associated fishhook, a blade and/or other lure attachments used to construct a lure for fishing.

As seen in FIG. 2, a weight 40 is affixed to arm 18 of wireform 10 about anchor 16 (not seen in FIG. 2). In this manner, when wireform 10 is affixed to a completely constructed lure, mass of weight acts to stabilize an associated lure in water.

Further construction of an associated lure 50 is seen in FIG. 3 wherein a blade 60 and a fishhook assembly 70 are affixed to wireform 10. Note that mass of weight 40 does not bear directly upon blade 60. In the case of lure 50 fishhook assembly 70 comprises an elongated extension 72 affixed to a fishhook 80. Complements of blade 60 are disclosed in detail hereafter.

Reference is now made to FIGS. 4 and 5 whereat a blade 60 and fishhook 80' are seen affixed to wireform 10. As seen in FIG. 4, blade 60 has a planar forward face 81 which comprises two medially disposed holes 82 and 84. Note that leg 22 is disposed through hole 84 and leg 26 is disposed through hole 82. Note also, in FIG. 5 that fishhook 80' has an eyelet 88 which is disposed about bend 24 of wireform 10. In such construction, eyelet 88 should be threaded to bend 24 after leg 22 is disposed through hole 84, and before leg 26 is disposed through hole 82.

As seen in FIG. 6, with blade 60 so affixed to wireform 10 (not shown in FIG. 6 for clarity of presentation) and therefor further affixed to weight 40, oscillation of blade 60 results in side-to-side motion which is angulated about weight 40. As weight 40 comprises the majority of the mass of an associated lure, angular motion may be induced into weight 40 without a significant side-to-side disturbance of weight 40. Side-to-side motion of blade 60 is seen to be an arcing motion as depicted by arrow 90. Note, use of dashed lines for depicting a second, displaced position of blade 60.

Figure 7:
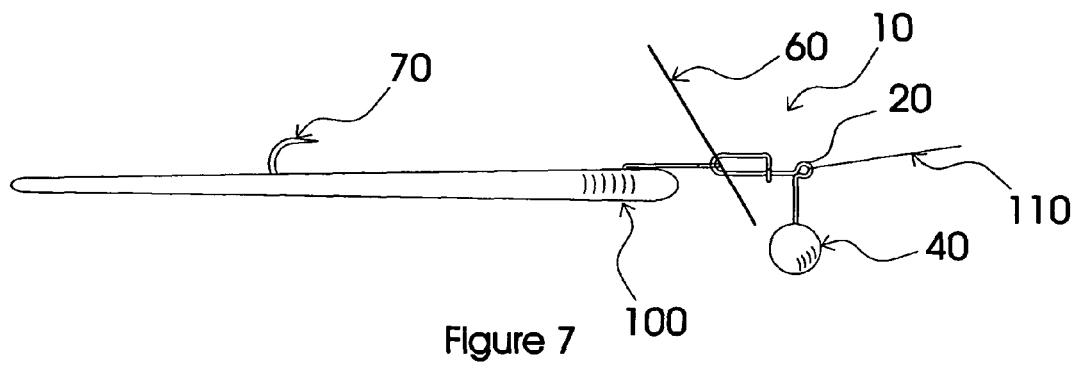
FIG. 7 is a side elevation of the wireform, weight, fishhook assembly and blade seen in FIG. 3 with an elongated bait affixed to the fishhook assembly.
Figure 8:
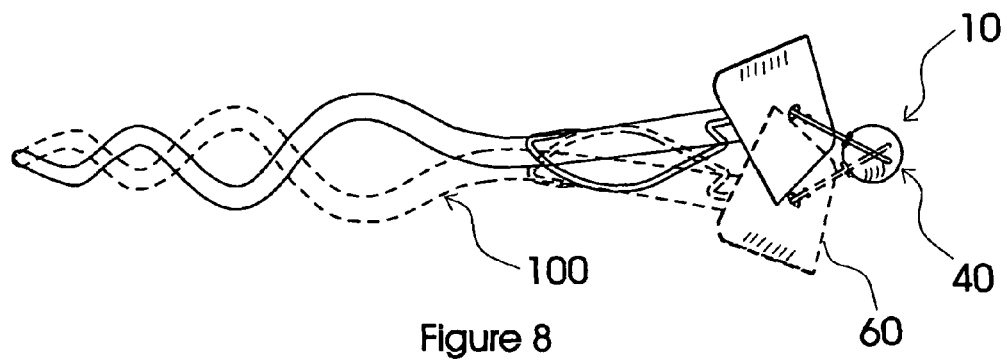
FIG. 8 is a top perspective of the fishing lure combination comprising a fishhook pivotally affixed to the wireform as seen in FIGS. 4 and 5 and wherein side-to-side divergence as seen in FIG. 6 is effected upon an attached elongated bait to produce sinusoidal action of the bait.

Side-to-side motion, as depicted in FIG. 6 is critical to creating a life-like action in a bait 100 affixed to a hook assembly 70, seen in FIG. 7. Note fishing line 110 affixed to ring 20 of wireform 10 which is generally used to displace (pull) wireform 10 and associated lure attachments through water. Side-to-side motion (oscillation) of blade 60 (see FIG. 6) as wireform 10 and bait 100 are displaced through water results in a sinusoidal action of bait 100 as seen in FIG. 8. Such action is a lifelike swimming action which is of significantly greater frequency than an action of a lure which is impeded by a weight affixed to a fishhook assembly. Such is the case because weight 40 is displaced from a wake created by blade 60 and effective motion of weight 40 due to side-to-side motion of blade 60 results in only simple rotation of weight 40. This is in opposition to any resulting side-to-side action of a weight which, because mass of the weight would result in smaller displacement, and likely lower oscillating frequency, than displacement and frequency of action of a blade free of such weight. The sinusoidal action of bait 100 which results from side-to-side displacement of blade 60 as seen in FIG. 8 is exemplary and frequency and amplitude of oscillation varies as a function of lure displacement velocity. The dashed line figure in FIG. 8 depicts an offset position similar to the offset position seen in FIG. 6, as blade 60 exhibits side-to-side motion when displaced through water.

Figure 9:
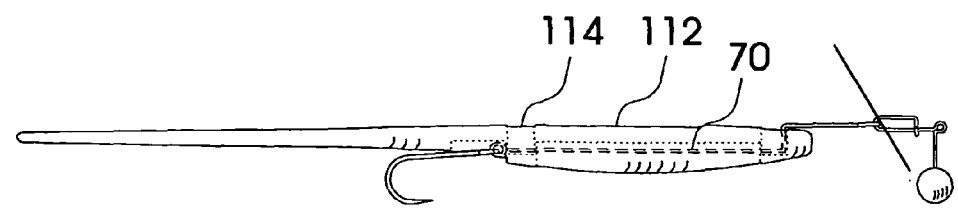
FIG. 9 is a side elevation of a lure combination which is similar to the combination seen in FIG. 7 except for a rotated fishhook and bait with grooves for facile attachment to the fishhook assembly.
Figure 10:
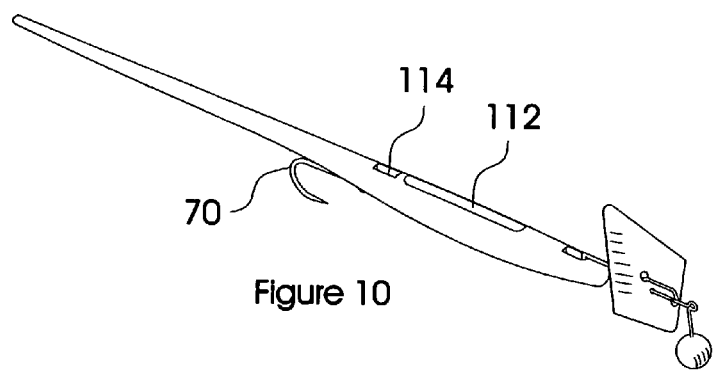
FIG. 10 is a perspective of the lure combination seen in FIG. 9.
Figure 11:
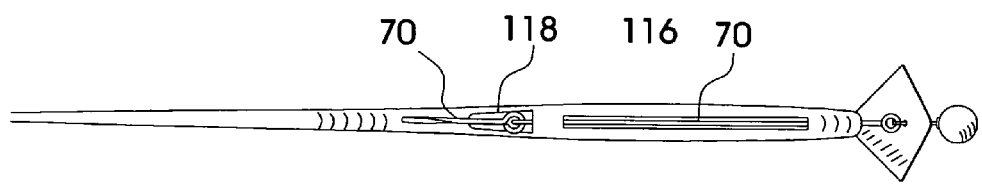
FIG. 11 is a bottom elevation of the lure combination seen in FIG. 10.

Although conventional commercial baits (such as bait 100 seen in FIGS. 7 and 8) may be used, for ease of exchanging and mounting fresh baits about hook assembly 70, baits may be provided with grooves and slits for easier handling. As seen in FIGS. 9-11, a bait may be provided having a series of grooves 112, 114, 116 and 118. Such grooves are examples of bait body molded features which provide for facile attachment to a fishhook assembly 70.

Figure 12:
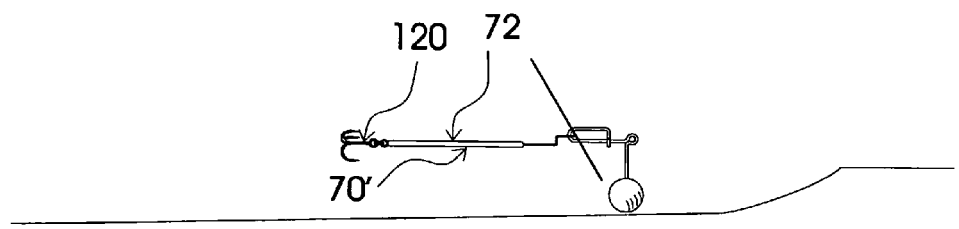
FIG. 12 is a side elevation of a lure combination in which a treble hook is affixed as part of a fishhook assembly.
Figure 13:
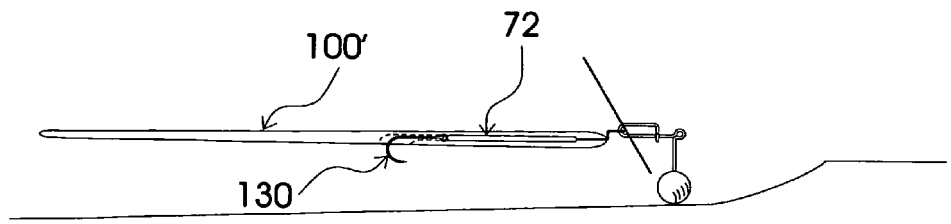
FIG. 13 is a side elevation of another lure combination, similar to the combination seen in FIG. 12, but with a single hook inferiorly disposed and a bait affixed thereto.

Examples of other forms of fishhook assemblies are seen in FIGS. 12 and 13. A treble hook 120 is affixed to an elongated extension 72 to form a fishhook assembly 70' in FIG. 12. A single inferiorly facing fishhook 130 affixed to an elongated extension 72 for easy threading of an elongated bait 100' is seen in FIG. 13.

Figure 14:
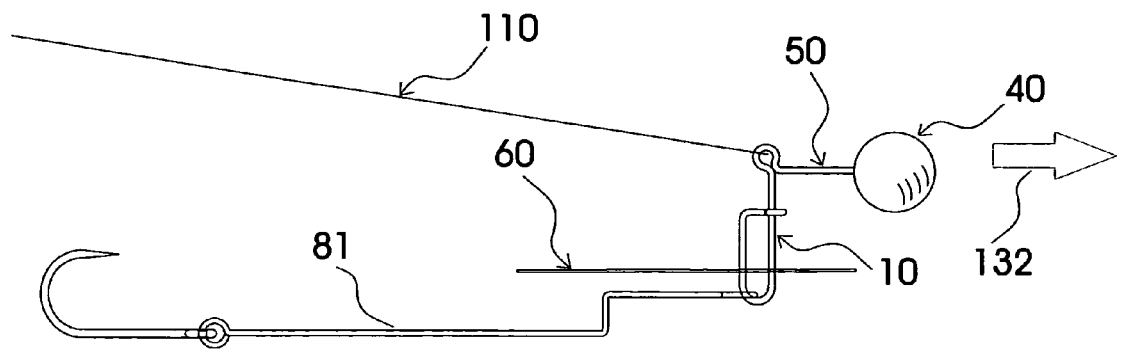
FIG. 14 is a side elevation of the lure seen in FIG. 10 in flight after having been cast.

As mentioned supra, lure action, generally attributed to side-to-side motion of blade 60, is but one of two major considerations in design of a fishing lure according to the present invention. The other major consideration is facility of casting. When fishing with a bladed fishing lure, it is important that the blade be disposed to oppose movement when being displaced through water. However, when cast, it is important that the blade "fly" with reduced resistance rather than impede or oppose lure flight. Reference is now made to FIG. 14 wherein a lure 50 is depicted in flight after being cast (in direction of arrow 132). Note that fishing line 110 trails weight 40, as the heavy mass and velocity of weight 40 provide the primary thrust for lure 50 and line 110. Also note that, when with weight 40 so aligned against line 110, wireform 10 is rotated relative to wireform 10 disposition when displaced through water. This rotation orients the forward facing plane 81 of blade 60 to be more horizontal and in line of flight than when displaced through water, and, therefore, more flight friendly (i.e. so oriented blade 60 exhibits lower flight resistance when cast than if oriented to resist being thrust through a fluid).

Figure 15:
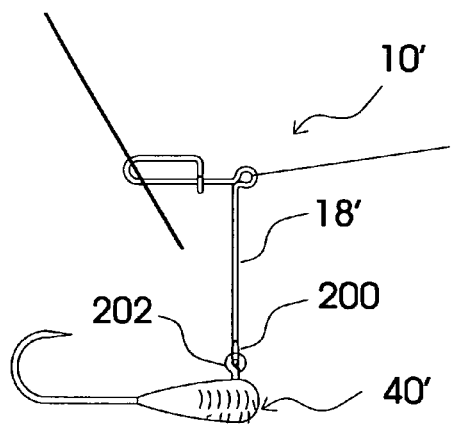
FIG. 15 is a side elevation of a lure assembly with a jig type lure affixed to a wireform in place of the weight seen in FIG. 2.
Figure 16:
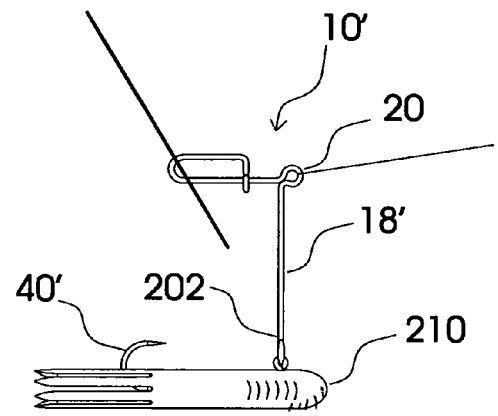
FIG. 16 is a side elevation of a lure assembly similar to the lure assembly of FIG. 15 with a soft bait cover disposed over the jig type lure.
Figure 17:
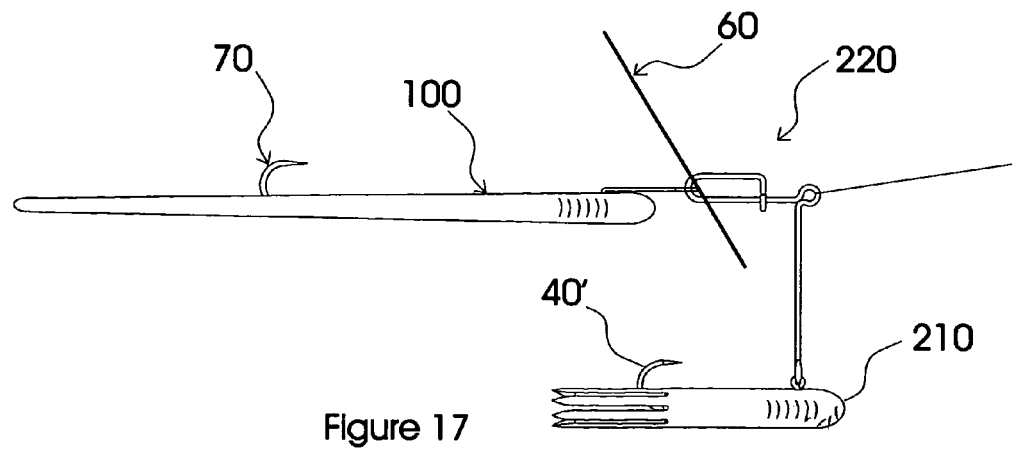
FIG. 17 is a side elevation of compound lure assembly similar to the lure assembly seen in FIG. 16 with the jig and soft bait cover affixed to the distending portion of a wireform while a fishhook assembly and an artificial bait is affixed to the wireform aft of the blade.

Reference is now made to FIG. 15, wherein a wireform 10', formed like wireform 10 except for an eyelet 200 formed at the inferior end 202 of an arm 18'. Note that a jig hook 40' may then be used instead of weight 40. Further an artificial bait 210 may be employed with jig hook 40' as seen in FIG. 16. A compound lure 220 may then be constructed as seen in FIG. 17. Lure 220 has a rapidly oscillating lure component formed by blade 60, fishhook assembly 70 and bait 100 with weighted jig hook 40' and bait 210 inferiorly disposed thereto.

The present embodiment should be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fishing lure comprising:
   a first wireform comprising a plurality of bends and a tag end which forms a releasable clasp having two associated legs forward from an aft loop, said wireform further comprising a forward loop whereat a fishing line is affixed and an integrally connected shaft, which distends inferiorly to a site below an associated blade when drawn through water and which is forwardly disposed relative to said clasp and the associated blade member;
   the blade member comprising only two medially disposed holes through which the legs of said wireform are individually disposed to maintain said blade member in a substantially upright state to assure blade oscillation by which side-to-side action is imposed upon the wireform when the lure is displaced through water;
   a fishhook assembly comprising an associated shaft and a connector disposed on the forward end of said shaft, said connector being securely, but pivotally affixed to said aft loop to be thereby effected by side-to-side displacement of said wireform;
   a weight affixed to the inferior end of the distending shaft such that the weight provides inertial mass for stabilizing said lure in water, but does not substantially affect side-to-side blade oscillation and resulting action of said fishhook assembly.

2. A fishing lure according to claim 1 wherein said fishhook assembly comprises an artificial bait, said artificial bait being imparted lifelike sinusoidal action by side-to-side action of said fishhook assembly.

3. A fishing lure according to claim 1 wherein said fishhook assembly comprises a natural bait, said natural bait being imparted lifelike sinusoidal action by side-to-side action of said fishhook assembly.

4. A fishing lure according to claim 1 wherein said fishhook assembly comprises an attached second elongated wireform having distal and proximal connecting loops at each end, said second wireform distal closed loop being attached to a hook and said wire form proximal closed loop being attached to said aft loop of said first wireform.

5. A compound fishing lure according to claim 1 wherein said weight is a part of a jig comprising a fishhook and weight affixed to a shaft of said fishhook.

* * * * *